United States Patent
Kawase et al.

(10) Patent No.: US 11,177,492 B2
(45) Date of Patent: Nov. 16, 2021

(54) METHOD FOR CONTROLLING FUEL CELL VEHICLE

(71) Applicant: HONDA MOTOR CO., LTD., Tokyo (JP)

(72) Inventors: Satoru Kawase, Wako (JP); Koichi Takaku, Wako (JP); Takatsugu Koyama, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 901 days.

(21) Appl. No.: 15/491,977

(22) Filed: Apr. 20, 2017

(65) Prior Publication Data

US 2017/0331130 A1 Nov. 16, 2017

(30) Foreign Application Priority Data

May 12, 2016 (JP) .............................. JP2016-096051

(51) Int. Cl.
| | |
|---|---|
| *H01M 8/04664* | (2016.01) |
| *H01M 8/04082* | (2016.01) |
| *H01M 8/0438* | (2016.01) |
| *H01M 8/04955* | (2016.01) |
| *H01M 8/1018* | (2016.01) |

(52) U.S. Cl.
CPC ... *H01M 8/04671* (2013.01); *H01M 8/04201* (2013.01); *H01M 8/04425* (2013.01); *H01M 8/04955* (2013.01); *H01M 2008/1095* (2013.01); *H01M 2220/20* (2013.01); *H01M 2220/30* (2013.01); *H01M 2250/20* (2013.01)

(58) Field of Classification Search
None
See application file for complete search history.

(56) References Cited

U.S. PATENT DOCUMENTS

| | | | |
|---|---|---|---|
| 2003/0075156 A1* | 4/2003 | Morinaga | F02M 25/0809 123/520 |
| 2004/0107048 A1* | 6/2004 | Yokota | G01C 21/34 701/431 |
| 2014/0116524 A1* | 5/2014 | Asano | H01M 8/04388 137/12 |
| 2014/0272671 A1* | 9/2014 | Handa | B60L 3/00 429/515 |
| 2014/0295305 A1* | 10/2014 | Wake | H01M 8/04225 429/429 |
| 2016/0059734 A1* | 3/2016 | Suzuki | F17C 13/023 429/515 |
| 2016/0273472 A1* | 9/2016 | Ariie | F02M 37/0047 |

FOREIGN PATENT DOCUMENTS

| | | | | |
|---|---|---|---|---|
| JP | 2007-165055 | | 6/2007 | |
| JP | 2010-020910 | | 1/2010 | |
| JP | 2015206686 | * | 4/2014 | ......... F02D 41/0027 |

* cited by examiner

*Primary Examiner* — Brent A. Fairbanks
(74) *Attorney, Agent, or Firm* — Mori & Ward, LLP

(57) ABSTRACT

A method for controlling a fuel cell vehicle including a fuel cell to generate electric power via an electrochemical reaction between fuel gas and oxidant gas, the method includes determining whether the fuel cell vehicle is in a fuel supply state in which the fuel gas is supplied from an outside of the fuel cell vehicle into a fuel storage chamber via a filling lid box of the fuel cell vehicle. It is determined that the fuel gas does not leak, even if a fuel gas detector provided in the filling lid box detects the fuel gas when the fuel cell vehicle is in the fuel supply state.

16 Claims, 4 Drawing Sheets

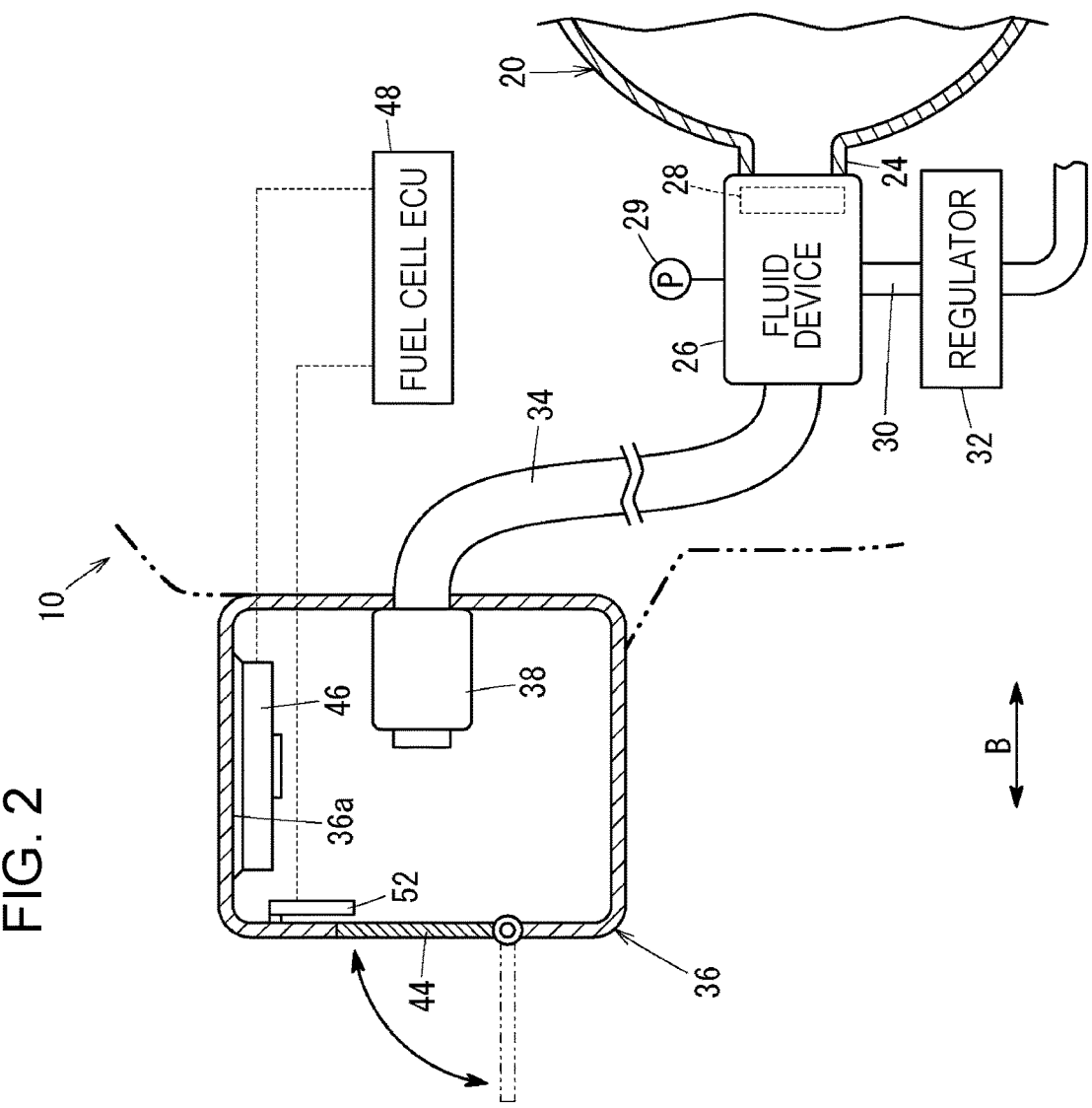
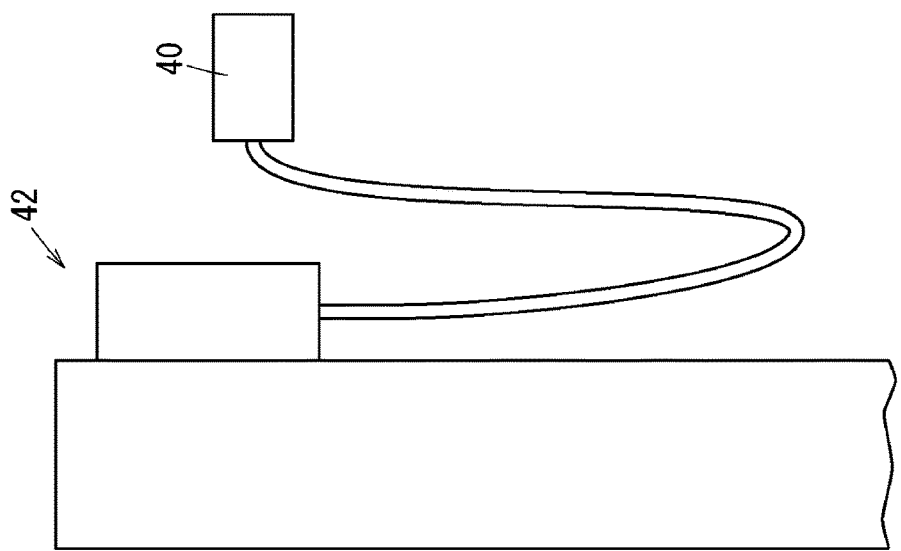
FIG. 2

METHOD FOR CONTROLLING FUEL CELL VEHICLE

CROSS-REFERENCE TO RELATED APPLICATIONS

The present application claims priority under 35 U.S.C. § 119 to Japanese Patent Application No. 2016-096051, filed May 12, 2016, entitled "Method for Controlling Fuel Cell Vehicle." The contents of this application are incorporated herein by reference in their entirety.

BACKGROUND

1. Field

The present disclosure relates to a method for controlling a fuel cell vehicle.

A solid polymer electrolyte fuel cell generally employs a solid polymer electrolyte membrane made of a polymer ion exchange membrane. A fuel cell has a membrane electrode assembly (MEA) in which an anode electrode is disposed on one surface of a solid polymer electrolyte membrane and a cathode electrode is disposed on the other surface of the solid polymer electrolyte membrane. Each of the anode electrode and the cathode electrode includes a catalyst layer (electrocatalyst layer) and a gas diffusion layer (porous carbon).

A power generation cell is constructed by sandwiching the membrane electrode assembly with separators (bipolar plates). A fuel cell stack is formed by stacking a predetermined number of these power generation cells, and is mounted on a fuel cell vehicle such as a fuel cell electric vehicle.

In a fuel cell vehicle, a fuel gas tank (hydrogen tank) is placed in, for example, a rear part of a vehicle (in a trunk or under a floor). Here, various ideas have been proposed in order to detect a gas leakage from the fuel gas tank.

For example, Japanese Unexamined Patent Application Publication No. 2010-20910 discloses a hydrogen detection device for a vehicle which includes: an open-close detector which detects opening and closing of a hydrogen filling port of a fuel cell vehicle; a hydrogen sensor which is provided near the hydrogen filling port and detects hydrogen gas; and a keyless entry vehicle mounted device. The keyless entry vehicle mounted device acquires information from the open-close detector and the hydrogen sensor, and controls at least locking and unlocking of a key for the vehicle by communicating with a keyless entry portable device carried by an operator.

When the keyless entry vehicle mounted device detects opening of the hydrogen replenishment port with the open-close detector, the keyless entry vehicle mounted device measures a concentration of hydrogen gas with the hydrogen sensor. When the concentration exceeds a predetermined threshold, the keyless entry vehicle mounted device communicates with the keyless entry portable device and causes the keyless entry portable device to execute a warning operation.

On the other hand, a fuel cell system disclosed in Japanese Unexamined Patent Application Publication No. 2007-165055 aims to obtain a state of charge (SOC) necessary for an energy storage unit at the start of the system. To this end, an operation to charge the energy storage unit is performed while the system is being stopped. During that period, in the hydrogen detection device for a vehicle described above, the hydrogen sensor continues processing of detecting whether or not there is a leakage of hydrogen.

SUMMARY

According to one aspect of the present invention, a method for controlling a fuel cell vehicle including a fuel cell which generates power through an electrochemical reaction between fuel gas and oxidant gas, a fuel storage chamber which stores the fuel gas, a filling lid box which includes, inside thereof, a gas filling port for filling the fuel storage chamber with the fuel gas from an outside of the vehicle, and a lid member which is capable of opening and closing the gas filling port toward the outside of the vehicle, a fuel gas detection unit which is placed inside the filling lid box and detects a leakage of the fuel gas, and a controller which receives a detection signal from the fuel gas detection unit, the method includes the steps of notifying a user if the fuel gas detection unit detects the leakage of the fuel gas while the fuel cell is generating power or while the controller is in operation. The steps of not notifying the user if the fuel gas detection unit detects the leakage of fuel gas under a condition that it is determined the fuel storage chamber is being filled with the fuel gas from the outside of the vehicle while the fuel cell is generating power or while the controller is in operation.

According to another aspect of the present invention, a method for controlling a fuel cell vehicle including a fuel cell to generate electric power via an electrochemical reaction between fuel gas and oxidant gas, the method includes determining whether the fuel cell vehicle is in a fuel supply state in which the fuel gas is supplied from an outside of the fuel cell vehicle into a fuel storage chamber via a filling lid box of the fuel cell vehicle. It is determined that the fuel gas does not leak, even if a fuel gas detector provided in the filling lid box detects the fuel gas when the fuel cell vehicle is in the fuel supply state.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

FIG. 2 is an explanatory diagram of a main part of the fuel cell vehicle.

DESCRIPTION OF THE EMBODIMENTS

Figure 1:
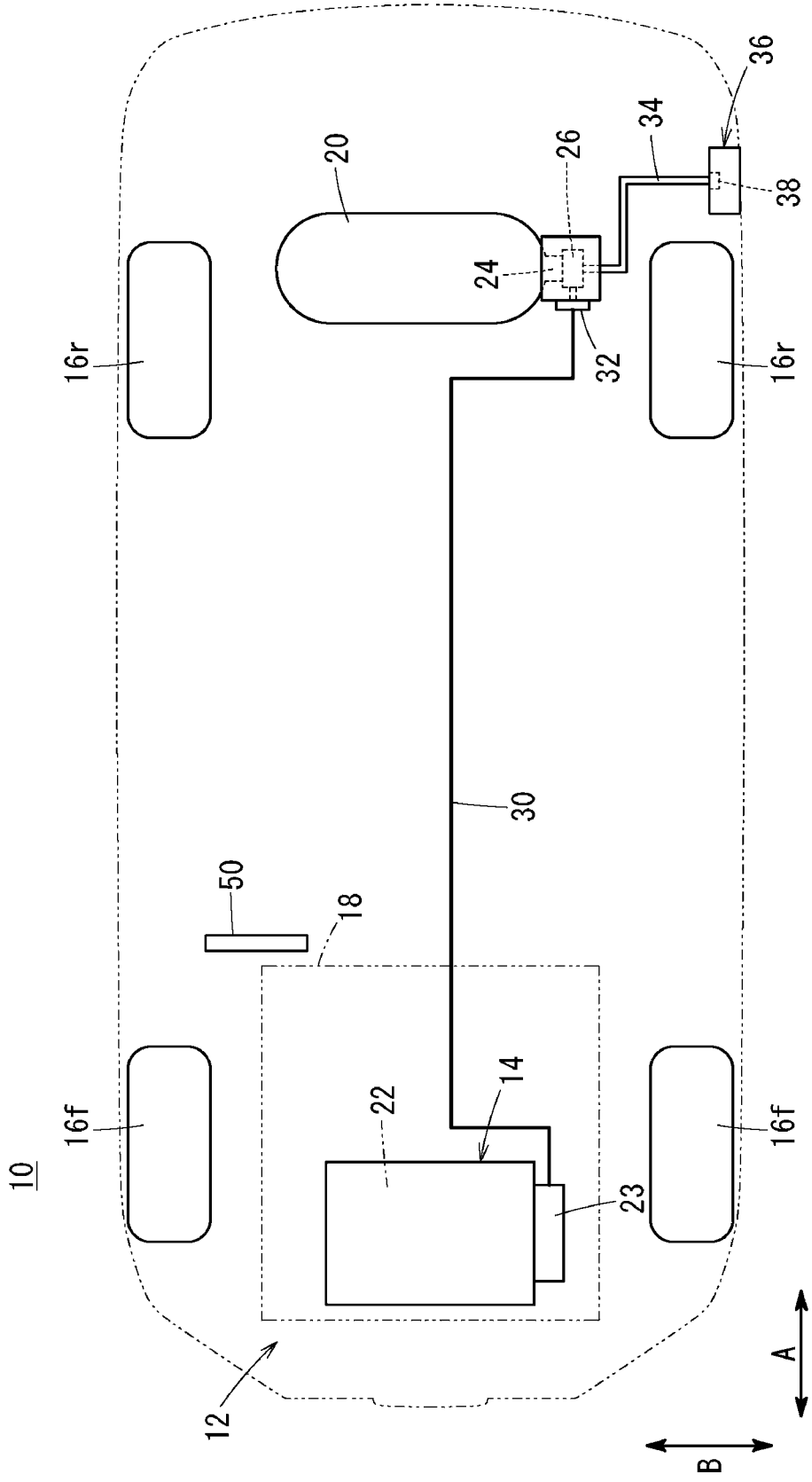
FIG. 1 is a plan view for explanation schematically illustrating a schematic overall configuration of a fuel cell vehicle to which a control method according to an embodiment of the disclosure is applied.

The embodiments will now be described with reference to the accompanying drawings, wherein like reference numerals designate corresponding or identical elements throughout the various drawings.

As illustrated in FIG. 1, a fuel cell vehicle 10 to which a control method according to an embodiment of the present disclosure is applied is a fuel cell electric vehicle, for example, and has a fuel cell system 12 mounted thereon.

The fuel cell system 12 includes a fuel cell stack 14, and the fuel cell stack 14 is disposed inside a motor room 18 near front wheels 16f and 16f. A hydrogen tank (fuel storage chamber) 20 is disposed between rear wheels 16r and 16r. Note that the number of hydrogen tanks 20 may be one, or two or more with different capacities.

In the fuel cell stack 14, multiple fuel cells 22 are stacked in a horizontal direction (direction of arrow B) or a direction of gravity. Although not illustrated, in a fuel cell 22, a pair of separators sandwich a membrane electrode assembly, for example. The membrane electrode assembly has a cathode electrode provided on one surface of a solid polymer electrolyte membrane, and an anode electrode provided on the other surface of thereof. The cathode electrode is supplied with oxidant gas (for example, air), while the anode electrode is supplied with fuel gas (for example, hydrogen gas). Power is generated through an electrochemical reaction between oxygen in the air and the hydrogen gas.

A hydrogen gas supply device 23 which supplies hydrogen gas is connected to the fuel cell stack 14. In addition, an air supply device (not illustrated) which supplies air and a coolant supply device (not illustrated) which supplies a coolant are connected to the fuel cell stack 14.

As illustrated in FIGS. 1 and 2, the hydrogen tank 20 stores high-pressure hydrogen and has a hydrogen passage port (hydrogen inlet port and hydrogen outlet port) 24 formed at an end portion thereof. A fluid device 26 is connected to the hydrogen passage port 24. The fluid device 26 has a valve apparatus including an open-close valve 28 and a joint apparatus, and includes a pressure sensor 29 which detects a hydrogen pressure inside the hydrogen tank 20.

For example, one end portion of a hydrogen supply pipe 30 is connected to the fluid device 26 via the joint apparatus, while the other end portion of the hydrogen supply pipe 30 is connected to the hydrogen gas supply device 23 (see FIG. 1). A regulator 32 is disposed on the hydrogen supply pipe 30 and is in the vicinity of the fluid device 26.

One end portion of a hydrogen filling pipe 34 is connected to the fluid device 26. The other end portion of the hydrogen filling pipe 34 extends in one of vehicle width directions (directions of arrow B) of the fuel cell vehicle 10 (for example, on the left side in the rear), and is connected to a gas filling port 38, which is an external connection port placed in the filling lid box 36.

Figure 3:
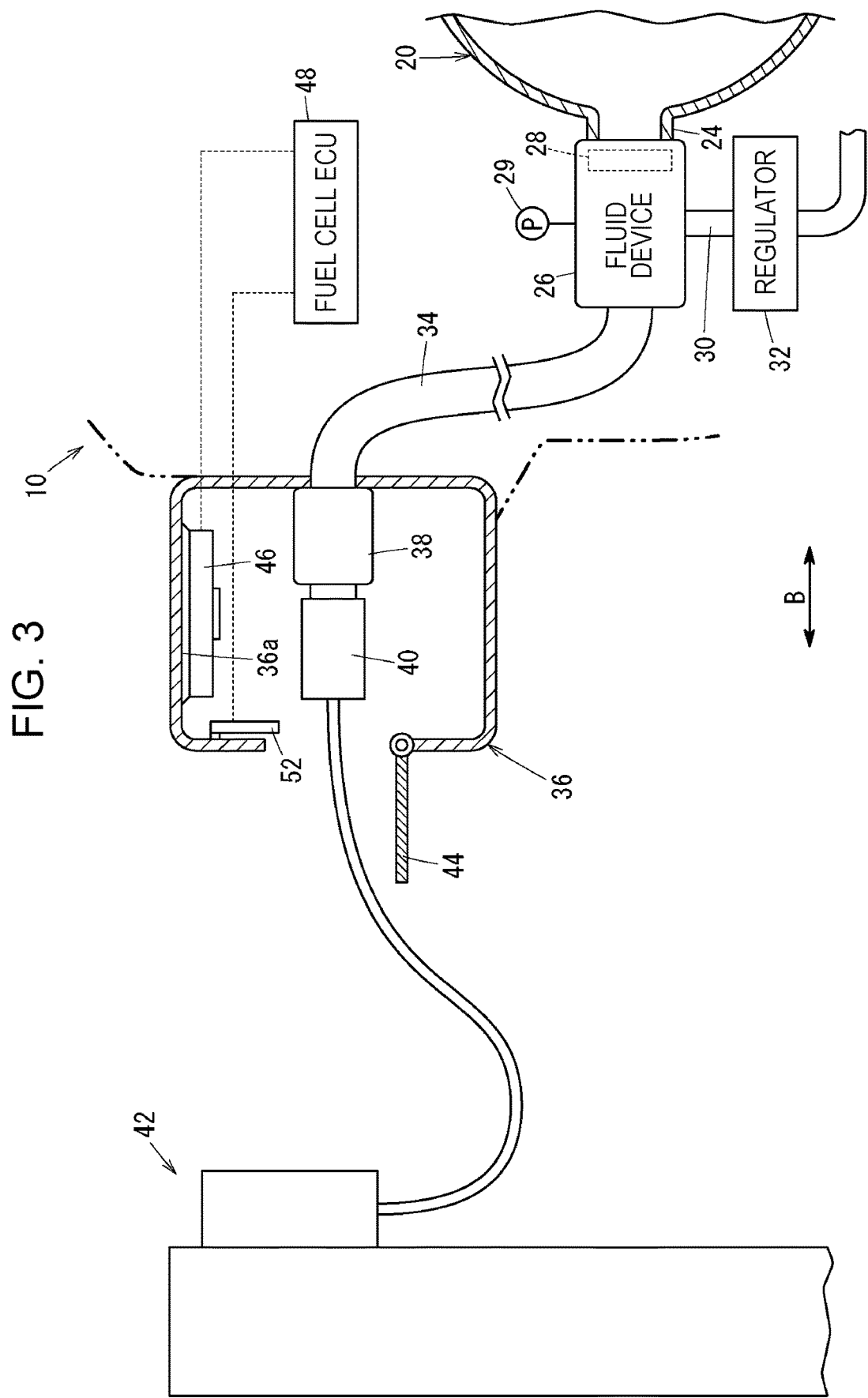
FIG. 3 is an explanatory diagram of a connection state between the inside of a filling lid box constituting the fuel cell vehicle and a filling plug.

As illustrated in FIGS. 2 and 3, a filling plug (station nozzle) 40 is connected to the gas filling port 38 for the purpose of filling the hydrogen tank 20 with hydrogen gas from the outside of the fuel cell vehicle 10. The filling plug 40 is provided to the hydrogen supply station 42 and is connected to the hydrogen supply station 42 manually (or automatically).

A tip end of the filling lid box 36 includes a lid member 44 which can open and close the gas filling port 38 toward the outside of the vehicle. A hydrogen sensor (fuel gas detection unit) 46 is placed on a ceiling 36a inside the filling lid box 36. The hydrogen sensor 46 detects a leakage of hydrogen gas, and sends the detection signal to a fuel cell ECU (controller) 48. When the hydrogen sensor 46 detects the leakage of hydrogen gas, the fuel cell ECU 48 causes a monitor 50 as illustrated in FIG. 1 to display (to give a notification on) the leakage information.

As illustrated in FIGS. 2 and 3, a lid sensor 52, which detects opening and closing of the lid member 44, is placed inside the filling lid box 36. The lid member 44 is opened and closed by the user manipulating a not-illustrated lid switch. On the other hand, the lid sensor 52 detects an open-close status of the lid member 44, and sends the detection signal to the fuel cell ECU 48.

An operation of the fuel cell vehicle 10 configured as described above is described below.

First, while the fuel cell vehicle 10 is being driven, hydrogen gas discharged out of the hydrogen tank 20 passes through the hydrogen supply pipe 30 under the action of the regulator 32 and is supplied to the fuel cell stack 14 at the hydrogen gas supply device 23, as illustrated in FIG. 1. In the air supply device, air is supplied to the fuel cell stack 14 by a not-illustrated air pump or the like, while in the coolant supply device, a coolant is supplied to the fuel cell stack 14 by a not-illustrated pump or the like.

As mentioned above, at each fuel cell 22, the anode electrode is supplied with hydrogen gas, while the cathode electrode is supplied with air. Thus, in the membrane electrode assembly, hydrogen gas supplied to the anode electrode and oxygen in the air supplied to the cathode electrode is consumed in the electrocatalyst layer through an electrochemical reaction, and thereby power is generated. Hence, power is supplied to a drive motor (not illustrated), making it possible for the fuel cell vehicle 10 to be driven.

Subsequently, when the hydrogen tank 20 is to be filled with hydrogen gas, the fuel cell vehicle 10 is transported to the hydrogen supply station 42, as illustrated in FIG. 2. Then, the lid member 44 is released by the user manipulating the not-illustrated lid switch.

As illustrated in FIG. 3, while the filling plug 40 of the hydrogen supply station 42 is connected to the gas filling port 38 inside the filling lid box 36, hydrogen gas, adjusted to a desired flow rate, is supplied to the gas filling port 38. Thus, the hydrogen tank 20 is filled with the hydrogen gas having passed through the hydrogen filling pipe 34 and from the fluid device 26 via the hydrogen passage port 24.

When the filling with hydrogen gas is completed, the filling plug 40 is detached from the gas filling port 38, and is removed from the filling lid box 36. Then, the lid member 44 is closed through automatic manipulation or manual manipulation.

Next, the control method according to the embodiment of the present disclosure is described below along with a flowchart illustrated in FIG. 4.

First, the hydrogen sensor 46 functions only when the fuel cell ECU 48 is in operation. When the hydrogen tank 20 is being filled with hydrogen gas from the hydrogen supply station 42, a power system has already been stopped, and the fuel cell ECU 48 has already shifted to a stoppage operation for the fuel cell system 12. For this reason, during hydrogen gas filling, the fuel cell stack 14 is generating power or only the fuel cell ECU 48 is in operation, which means that the hydrogen sensor 46 is functioning. There is a case where the fuel cell ECU 48 functions for a predetermined period of time after the power generation is stopped in order to, for example, detect a fault.

Note that in the stoppage operation for the fuel cell system 12, cathode flow passages and anode flow passages of the fuel cell stack 14 are blocked. Thus, in the fuel cell stack 14, oxygen in the air remaining in the blocked cathode flow passages and hydrogen gas remaining in the blocked anode flow passages are consumed through an electrochemical reaction. As a result, the air in the cathode flow passages goes nitrogen rich, or in other words, $O_2$ lean, where oxygen concentration is low.

Moreover, in the stoppage operation for the fuel cell system 12, in order to obtain the power necessary at the time of activation, charging is performed so that a not-illustrated battery (such as a rechargeable battery) reaches a desired state of charge (SOC), for example.

When the hydrogen sensor 46 detects a leakage of hydrogen gas equal to or higher than a predetermined level while the fuel cell stack 14 is generating power (YES at step S1), the hydrogen sensor 46 sends the detection signal to the fuel cell ECU 48. The fuel cell ECU 48 determines whether or not the hydrogen tank 20 is being filled with hydrogen gas (in a state of being filled) from the hydrogen supply station 42 (outside of the vehicle) (step S2).

Here, the determination as to whether or not the filling with hydrogen gas is taking place is made in Embodiments 1 to 4 to be described later. Note that it suffices to perform any one of Embodiments 1 to 4, or alternatively, to combine two or more of the Embodiments.

In Embodiment 1, the determination is made based on a status of the lid sensor 52 which detects opening and closing of the lid member 44. To be more specific, when the lid sensor 52 detects that the lid member 44 is released, the status is determined to be one where the hydrogen tank 20 is being filled with hydrogen gas from the hydrogen supply station 42.

In Embodiment 2, the determination is made based on whether or not the fuel cell vehicle 10 is detected to have moved to a predetermined position. Specifically, for example, the Global Positioning System (GPS) is employed. In this case, position coordinates of the fuel cell vehicle 10 are used. When the fuel cell vehicle 10 is detected to have been transported to the hydrogen supply station 42, the status is determined to be one where the hydrogen tank 20 is being filled with hydrogen gas from the hydrogen supply station 42.

In Embodiment 3, the determination is made based on a status of the lid switch (not illustrated) which is manipulated to open and close the lid member 44. When the user manipulates the lid switch, the lid member 44 is released and, at the same time, a manipulation signal of the lid switch is sent. Thus, based on the manipulation signal of the lid switch, the status is determined to be one where the hydrogen tank 20 is being filled with hydrogen gas from the hydrogen supply station 42.

In Embodiment 4, the determination is made based on a detection value of the pressure sensor 29 which detects a hydrogen gas pressure inside the hydrogen tank 20. To be more specific, when the pressure sensor 29 detects that the hydrogen gas pressure is increasing, the status is determined to be one where the hydrogen tank 20 is being filled with hydrogen gas from the hydrogen supply station 42.

Figure 4:
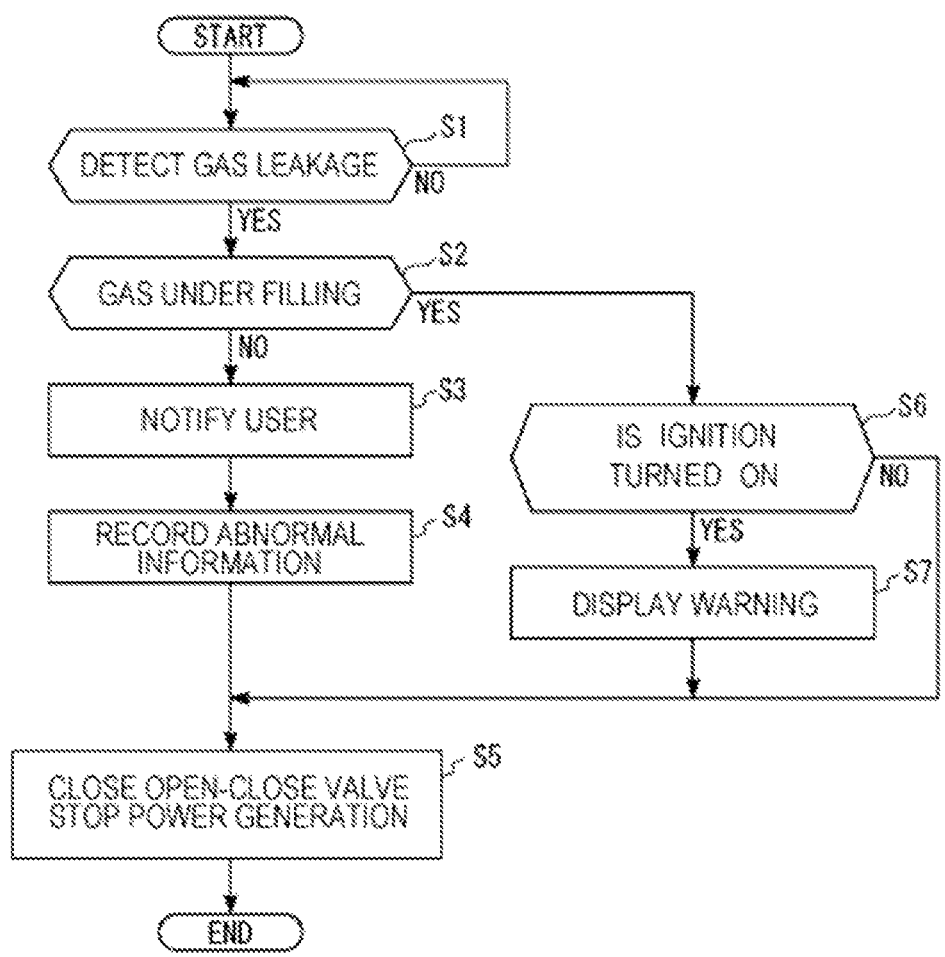
FIG. 4 is a flowchart which explains the control method.

As illustrated in FIG. 4, when it is determined that the hydrogen tank 20 is not being filled with hydrogen gas (NO at step S2), the processing proceeds to step S3. Then, the user is notified of the determination on the monitor 50. The notification content is, for example, "HYDROGEN LEAKAGE DETECTED. PLEASE INSPECT VEHICLE AT DEALER IMMEDIATELY." Further, the processing proceeds to step S4, where the fuel cell ECU 48 records abnormal information. Thereafter, the processing proceeds to step S5, where the open-close valve 28 constituting the fluid device 26 is closed and the power generation by the fuel cell stack 14 is stopped.

On the other hand, when it is determined that the hydrogen tank 20 is being filled with hydrogen gas (YES at step S2), the processing proceeds to step S6. Then, a determination is made as to whether or not an ignition switch is turned on (ON). When it is determined that the ignition switch is turned on (YES at step S6), the processing proceeds to step S7. At step S7, displayed on the monitor 50 is a warning which reads, for example, "KEEP POWER SYSTEM OFF".

Additionally, when it is determined that the ignition switch is turned off (NO at step S6), the processing bypasses steps S3 and S4 to proceed to step S5. To be more precise, the user is not notified of the determination on the monitor 50, and what is more, the fuel cell ECU 48 does not record abnormal information.

At step S5, power generation by the fuel cell stack 14 is stopped. During the time the power generation is stopped, the hydrogen tank 20 continues to be filled with hydrogen gas. In the case where the power generation by the fuel cell stack 14 is stopped during hydrogen gas filling and during the time the ignition switch is turned off, it is possible to resume the stoppage operation for the fuel cell system 12 after the hydrogen gas filling is completed.

After that, when a leakage of hydrogen gas is detected during the resumed stoppage operation, this indicates that there may be a leakage of the hydrogen gas on the fuel cell vehicle 10 side.

Moreover, after the hydrogen gas filling for the hydrogen tank 20 is completed, the abnormal information recorded in the fuel cell ECU 48 is reset.

In such a case, if the hydrogen sensor 46 detects a leakage of hydrogen gas while the fuel cell stack 14 is generating power, the user is notified of the leakage in the embodiment. On the other hand, if the hydrogen sensor 46 detects a leakage of hydrogen gas under the condition that the status is determined to be one where the hydrogen tank 20 is being filled with the hydrogen gas from the hydrogen supply station 42 while the fuel cell stack 14 is generating power, the user is not notified of the leakage.

If the hydrogen sensor 46 detects a leakage of hydrogen gas while the hydrogen tank 20 is being filled with the hydrogen gas, it could be that the hydrogen gas is leaking on the hydrogen supply station 42 side, not on the fuel cell vehicle 10. For this reason, the user is not notified of the leakage as described above, and it is therefore possible to prevent a situation where an unnecessary notification is issued to the user. Hence, it is possible to guarantee good convenience for the user by avoiding an unnecessary notification to the user when a gas leakage other than on the fuel cell vehicle 10 side is detected.

In addition, power generation of the fuel cell stack 14 is stopped also in the case where the user is not notified of the leakage. Thus, it is possible to ensure safety even more reliably in terms of the leakage of hydrogen gas.

Furthermore, when the hydrogen gas filling for the hydrogen tank 20 from the hydrogen supply station 42 is completed, the hydrogen sensor 46 executes the processing of detecting again the leakage of the hydrogen gas. This therefore makes it possible to conclude whether or not hydrogen gas is leaking on the fuel cell vehicle 10 side.

Still further, when the hydrogen gas filling for the hydrogen tank 20 from the hydrogen supply station 42 is completed, stoppage operation for the fuel cell system 12 is resumed. This therefore makes it possible to maintain the fuel cell system 12 in a desired stop state and to delay deterioration of the fuel cell stack 14.

Meanwhile, the determination as to whether or not the hydrogen tank 20 is being filled with hydrogen gas from the hydrogen supply station 42 is made based on the status of the lid sensor 52 which detects opening and closing of the lid member 44. For this reason, it is possible to easily determine whether or not the hydrogen tank 20 is being filled.

Furthermore, the determination as to whether or not the hydrogen tank 20 is being filled with hydrogen gas from the hydrogen supply station 42 is made based on whether or not the fuel cell vehicle 10 is detected to have moved to a predetermined position, in other words, the hydrogen supply station 42. For this reason, it is possible to easily determine whether or not the hydrogen tank 20 is being filled.

Still further, the determination as to whether or not the hydrogen tank 20 is being filled with hydrogen gas from the hydrogen supply station 42 is made based on the status of the lid switch which is manipulated to open and close the lid member 44. For this reason, it is possible to easily determine whether or not the hydrogen tank 20 is being filled.

Yet further, the determination as to whether or not the hydrogen tank 20 is being filled with hydrogen gas from the hydrogen supply station 42 is made based on the increase in detection value of the pressure sensor 29 which detects the hydrogen gas pressure inside the hydrogen tank 20. For this reason, it is possible to reliably determine whether or not the hydrogen tank 20 is being filled.

What is more, the fuel cell ECU 48 does not record the abnormal information if the hydrogen sensor 46 detects the leakage of hydrogen gas under the condition that it is determined the hydrogen tank 20 is being filled with the hydrogen gas from the hydrogen supply station 42. For this reason, it is possible to prevent a situation where the residual abnormal information unnecessarily hinders next activation of the fuel cell system 12.

A fuel cell vehicle to which a control method according to the present disclosure is applied includes: a fuel cell, a fuel storage chamber, a filling lid box, a fuel gas detection unit, and a controller. The fuel cell generates power through an electrochemical reaction between a fuel gas and an oxidant gas, and the fuel storage chamber stores the fuel gas. An inner side of the filling lid box includes, inside thereof, a gas filling port for filling the fuel storage chamber with fuel gas from the outside of a vehicle, and a lid member which is capable of opening and closing the gas filling port toward the outside of the vehicle. The fuel gas detection unit is placed inside the filling lid box and detects a leakage of the fuel gas. The controller receives a detection signal from the fuel gas detection unit.

This control method includes notifying a user if the fuel gas detection unit detects the leakage of the fuel gas while the fuel cell is generating power or while the controller is in operation. On the other hand, the control method includes not notifying the user if the fuel gas detection unit detects the leakage of the fuel gas under a condition that it is determined the fuel storage chamber is being filled with the fuel gas from the outside of the vehicle while the fuel cell is generating power or while the controller is in operation.

In addition, in this control method, it is preferable that the fuel cell be caused to stop generating power in a case where the user is not notified.

Furthermore, in this control method, it is preferable that the fuel gas detection unit perform processing of detecting the leakage of the fuel gas when filling of the fuel storage chamber with the fuel gas from the outside of the vehicle is completed.

Still further, in this control method, it is preferable that a stoppage operation for the fuel cell be performed when filling of the fuel storage chamber with the fuel gas from the outside of the vehicle is completed.

In addition, in this control method, it is preferable that determination as to whether or not the fuel storage chamber is being filled with the fuel gas from the outside of the vehicle be made based on a status of a lid sensor which detects the opening and closing of the lid member.

Moreover, in this control method, it is preferable that determination as to whether or not the fuel storage chamber is being filled with the fuel gas from the outside of the vehicle be made based on whether or not the fuel cell vehicle is detected to have moved to a predetermined position.

Yet further, in this control method, it is preferable that determination as to whether or not the fuel storage chamber is being filled with the fuel gas from the outside of the vehicle be made based on a status of a lid switch which is manipulated to open and close the lid member.

Additionally, in this control method, it is preferable that determination as to whether or not the fuel storage chamber is being filled with the fuel gas from the outside of the vehicle be made based on a detection value of a pressure sensor which detects a fuel gas pressure inside the fuel storage chamber.

Lastly, in this control method, it is preferable that the controller do not record abnormal information if the fuel gas detection unit detects the leakage of the fuel gas under a condition that it is determined the fuel storage chamber is being filled with the fuel gas from the outside of the vehicle.

According to the present disclosure, if the fuel gas detection unit detects a leakage of fuel gas under the condition that the fuel storage chamber is being filled with the fuel gas from the outside of the vehicle while the fuel cell is generating power, the fuel gas is leaking on the hydrogen supply station side. For this reason, it is possible to prevent a situation where an unnecessary notification (for example, occurrence of a leakage of fuel gas) is issued to a user in spite of the fact that there is no leakage of fuel gas on the vehicle side. This makes it possible to guarantee good convenience for the user by avoiding an unnecessary notification to the user when a gas leakage other than on the vehicle side is detected.

Obviously, numerous modifications and variations of the present invention are possible in light of the above teachings. It is therefore to be understood that within the scope of the appended claims, the invention may be practiced otherwise than as specifically described herein.

What is claimed is:

1. A method for controlling a fuel cell vehicle including:
   a fuel cell which generates power through an electrochemical reaction between fuel gas and oxidant gas;
   a fuel storage chamber which stores the fuel gas;
   a filling lid box which includes, inside thereof, a gas filling port for filling the fuel storage chamber with the fuel gas from an outside of the vehicle, and a lid member which is capable of opening and closing the gas filling port toward the outside of the vehicle;
   a fuel gas detection unit which is placed inside the filling lid box and detects a leakage of the fuel gas; and
   a controller which receives a detection signal from the fuel gas detection unit,
   the method comprising the steps of:
      while the fuel cell is generating power and/or while the controller is in operation, notifying a user of the leakage when:
         the fuel gas detection unit detects the leakage of the fuel gas; and
         the controller determines the fuel storage chamber is not being filled with the fuel gas from the outside of the vehicle; and
      while the fuel cell is generating power and/or while the controller is in operation, not notifying the user of the leakage and stopping power generation when:
         the fuel gas detection unit detects the leakage of the fuel gas when the controller determines the fuel storage chamber is being filled with the fuel gas from the outside of the vehicle, wherein when the user is not notified of the leakage when the fuel storage chamber is being filled, further determining whether an ignition of the fuel cell vehicle is on or off, and:
- when the fuel gas detection unit detects the leakage of the fuel gas and the ignition is on, then a warning is given to the user; and
- when the fuel gas detection unit detects the leakage of the fuel gas and the ignition is off, then power generation of the fuel cell is stopped without notifying the user of the determination of the ignition.

2. The method according to claim 1, wherein
the fuel gas detection unit performs processing of detecting the leakage of the fuel gas when filling of the fuel storage chamber with the fuel gas from the outside of the vehicle is completed.

3. The method according to claim 1, wherein
a stoppage operation for the fuel cell is performed when filling of the fuel storage chamber with the fuel gas from the outside of the vehicle is completed, the stoppage operation including:
- blocking cathode flow passages and anode flow passages of the fuel cell stack; and
- using the fuel cell to charge a battery to reach a predetermined state of charge.

4. The method according to claim 1, wherein
determination as to whether or not the fuel storage chamber is being filled with the fuel gas from the outside of the vehicle is made based on a status of a lid sensor which detects the opening and closing of the lid member.

5. The method according to claim 1, further comprising:
acquiring position coordinates of the fuel cell vehicle, wherein
determination as to whether or not the fuel storage chamber is being filled with the fuel gas from the outside of the vehicle is made based on whether or not the position coordinates of the fuel cell vehicle are determined to have moved to a predetermined position.

6. The method according to claim 1, wherein
determination as to whether or not the fuel storage chamber is being filled with the fuel gas from the outside of the vehicle is made based on a status of a lid switch which is manipulated to open and close the lid member.

7. The method according to claim 1, wherein
determination as to whether or not the fuel storage chamber is being filled with the fuel gas from the outside of the vehicle is made based on a detection value of a pressure sensor which detects a fuel gas pressure inside the fuel storage chamber.

8. The method according to claim 1, wherein
the controller does not record abnormal information if the fuel gas detection unit detects the leakage of the fuel gas when the controller determines the fuel storage chamber is being filled with the fuel gas from the outside of the vehicle.

9. A method for controlling a fuel cell vehicle including a fuel cell to generate electric power via an electrochemical reaction between fuel gas and oxidant gas, the method comprising:
determining whether the fuel cell vehicle is in a fuel supply state in which the fuel gas is supplied from an outside of the fuel cell vehicle into a fuel storage chamber via a filling lid box of the fuel cell vehicle; determining that the fuel gas does not leak even if a fuel gas detector provided in the filling lid box detects the fuel gas when the fuel cell vehicle is in the fuel supply state;
notifying a user of fuel gas leakage when the fuel gas detector detects the fuel gas when the fuel cell vehicle is not in the fuel supply state; and
prohibiting notifying the user of the fuel gas leakage when it is determined that the fuel cell vehicle is in the fuel supply state even if the fuel gas detector detects the fuel gas, and further causing the fuel cell to stop generating power, wherein
when prohibiting notifying the user of the fuel gas leakage when the fuel storage chamber is being filled, further determining whether an ignition of the fuel cell vehicle is on or off, and:
- when the fuel gas detector detects the fuel gas and the ignition is on, then a warning is given to the user; and
- when the fuel gas detector detects the fuel gas and the ignition is off, then power generation of the fuel cell is stopped without notifying the user of the determination of the ignition.

10. The method according to claim 9, wherein
the fuel gas detector performs processing of detecting the fuel gas when filling of the fuel storage chamber with the fuel gas from the outside is completed.

11. The method according to claim 9, wherein
a stoppage operation for the fuel cell is performed when filling of the fuel storage chamber with the fuel gas from the outside is completed, the stoppage operation including:
- blocking cathode flow passages and anode flow passages of the fuel cell stack; and
- using the fuel cell to charge a battery to reach a predetermined state of charge.

12. The method according to claim 9, wherein
the filling lid box includes a gas filling port through which the fuel gas is supplied from the outside into the fuel storage chamber and a lid for the gas filling port, and
determination as to whether the fuel cell vehicle is in the fuel supply state is made based on a status of a lid sensor which detects opening and closing of the lid.

13. The method according to claim 9, further comprising:
acquiring position coordinates of the fuel cell vehicle, wherein
determination as to whether the fuel cell vehicle is in the fuel supply state is made based on whether or not the position coordinates of the fuel cell vehicle are determined to have moved to a predetermined position.

14. The method according to claim 9, wherein
the filling lid box includes a gas filling port through which the fuel gas is supplied from the outside into the fuel storage chamber and a lid for the gas filling port, and
determination as to whether the fuel cell vehicle is in the fuel supply state is made based on a status of a lid switch which is manipulated to open and close the lid.

15. The method according to claim 9, wherein
determination as to whether the fuel cell vehicle is in the fuel supply state is made based on a detection value of a pressure sensor which detects a fuel gas pressure inside the fuel storage chamber.

16. The method according to claim 9, wherein
the fuel cell vehicle includes a controller, and
the controller does not record abnormal information even if the fuel gas detector detects the fuel gas when the fuel cell vehicle is in the fuel supply state.

* * * * *